United States Patent [19]

Hashimoto et al.

[11] Patent Number: 4,649,003

[45] Date of Patent: Mar. 10, 1987

[54] METHOD FOR PRODUCING AN INORGANIC SINTERED BODY

[75] Inventors: Tadanori Hashimoto; Masaaki Hama, both of Osaka; Osamu Kobayashi, Chiba, all of Japan

[73] Assignee: Sumitomo Chemical Company, Limited, Osaka, Japan

[21] Appl. No.: 712,925

[22] Filed: Mar. 18, 1985

Related U.S. Application Data

[63] Continuation of Ser. No. 460,513, Jan. 24, 1983, abandoned.

[51] Int. Cl.$^4$ .............................................. C04B 35/64
[52] U.S. Cl. ...................................... 264/63; 264/209.1
[58] Field of Search ........................................... 264/63

[56] References Cited

U.S. PATENT DOCUMENTS

| | | | |
|---|---|---|---|
| 3,346,680 | 10/1967 | Bush | 264/63 |
| 4,158,688 | 6/1979 | Pett | 264/63 |
| 4,387,067 | 7/1983 | Kobayashi | 264/63 |

FOREIGN PATENT DOCUMENTS

| | | | |
|---|---|---|---|
| 704135 | 2/1965 | Canada | 264/63 |
| 1266202 | 4/1968 | Fed. Rep. of Germany | 264/63 |
| 706728 | 7/1954 | United Kingdom | 264/63 |

OTHER PUBLICATIONS

Levine, Sidney, Temporary Organic Binders for Ceramic Systems, Part II, p. 34, in Ceramic Age Feb./1960.

*Primary Examiner*—James Derrington
*Attorney, Agent, or Firm*—Sughrue, Mion, Zinn, Macpeak and Seas

[57] ABSTRACT

A method for producing an inorganic sintered body, comprising the steps of:
providing an inorganic powder;
providing an oxygen-containing wax type binder;
providing the inorganic powder and wax type binder in a molding device;
subjecting the combined inorganic powder and wax type binder to a molding process selected from the group consisting of extrusion molding and injection molding to produce a molded body; and
producing an inorganic sintered body from the molded body.

2 Claims, No Drawings

METHOD FOR PRODUCING AN INORGANIC SINTERED BODY

This is a continuation of application Ser. No. 460,513, filed 1/24/83 now abandoned.

FIELD OF THE INVENTION

In producing the sintered body of inorganic powders (inorganic sintered body; hereinafter referred simply to as "sintered body"), the present invention relates to a method for producing a homogeneous, high-density sintered body by molding and sintering of inorganic powders using a binder which is superior in handling at both molding and sintering steps.

BACKGROUND OF THE INVENTION

For producing the molded article of inorganic powders for producing inorganic sintered bodies (hereinafter referred to as "molded article") by extrusion or injection molding, various binders have so far been used. The fact is, however, that a binder, as selected with a view to the flowability of mixtures of the inorganic powder and binder from the standpoint of molding, is principally used with little attention being paid to an improvement in the high density of molded articles largely affecting the physical properties of products as well as the ease of binder removal on sintering affecting manufacturers. This originates from a condition of molding that, in extrusion and injection moldings, because of the limited discharge capacity of molding machines, markedly larger amounts of binder are used to ensure the flowability of powder required from the standpoints of the bulk density of molded article and sintering.

Molded articles obtained by extrusion or injection molding have an advantage that the inorganic powder is more homogeneously packed in them than in those obtained by press molding, and therefore, sintered bodies having a uniform particle size are very easy to produce. In press molding, however, molded articles having a powder packing density of about 60% based on the theoretical density are obtained relatively easily because the amount of binder used is generally as small as 5% by weight. in extrusion and injection moldings, a binder of amounts as large as 30% by weight is sometimes used, so that only molded articles having a powder packing density of about 40% are obtained. Such molded articles are defective in that sintered bodies obtained by their sintering are low in density as compared with those obtained from press molding. Although extrusion and injection moldings are superior in productivity to press molding and slip casting, it was difficult, because of their difficulty in obtaining high-density sintered bodies, to apply them to the production of functional ceramics such as translucent ceramics, magnetic ceramics, dielectric ceramics, high-strength ceramics and the like in which the function is exhibited only in the form of a sintered body having a density near to the theoretical one.

With molded articles obtained by extrusion or injection molding in which the powder packing density is low, because of their large shrinkage rate on sintering, it is difficult to maintain the dimentional precision of the sintered body obtained. This becomes a problem particularly with ceramics which are difficult in processing after sintering.

In order to improve the foregoing problems encountered in the extrusion or injection molding of inorganic powders, various kinds of binder have been studied. These binders are roughly divided into water-soluble ones and synthetic ones, but the both, because of their defects described below, are not sufficient to solve the foregoing problems.

The first binders, water-soluble ones, include starch, cellulose derivatives, polyvinyl alcohols and the like, and they are widely in use. These water-soluble binders will serve with less amounts of binder converted to solid matter as compared with the synthetic resin ones. However, when these binders are used in a solution containing water as solvent, the amount of the solution is almost equal to the synthetic resin binders and requires about 20% by weight based on the inorganic powder. As compared with the synthetic resin binders, the water-soluble binder solution is low in viscosity so that it easily penetrates between powders to well disperse the powders. However, due to its poor lubricating property, large quantities of water are necesary to give a required flowability. Further, when powders containing the water-soluble binder are extrustion- or injection-molded, there is caused an essential problem. More specifically, because the strength of a molded article is developed with the vaporization of solvent, the molded article immediately after molding is poor in strength and easily changes shape. Accordingly, it is difficult to handle. For this reason, extrusion or injection molding is carried out so that molded articles having a strength of some degree can be obtained by decreasing the amount of water. But this method, since it is based on the sacrifice of the flowability of powder, causes problems such as increase in discharge pressure as well as abrasion of molding machines by inorganic powders and accompanying staining of molded articles. Further, on removing water by drying the molded articles, cracks are easily generated owing to non-uniform drying, and in order to avoid this, a long period of time is necessary for drying. This also leads to a problem that productivity characteristic of extrusion and injection molding is decreased to a large extent.

As the second binders, i.e. synthetic resin ones, polystyrene, polypropylene, polyethylene and the like are used, but they have the following defects. The synthetic resin binders, because of their high melt viscosity, do not easily penetrate into the aggregates of inorganic powders resulting in insufficient dispersibility of powder. Further, they produce only molded articles which are low in powder packing density. Consequently, there is a problem that homogeneous and high-density sintered bodies are not obtained by sintering of such molded articles. The synthetic resin binders, because they are used for molding in a molten state, produce molded articles of high strength by immediate cooling after molding. Because of this, powder flowability on molding can be improved by using large amounts of binder unlike the water-soluble binders. With an increase in the amount, however, there is a problem that the molded article foams easily due to thermal decomposition of gases generated from the binders on sintering. In order to avoid this foaming, a step, generally called a defatting step, for removing the binder by thermal decomposition is applied. However, this requires a longer period of time than drying of the water-soluble binders, thereby resulting in a great reduction in productivity. There is also a method for producing molded articles of high strength by hardening synthetic resin binders other than the foregoing thermoplastic resins, for example thermosetting resins such as phenol resins, urethane resins, etc. on molding. But these binders have a danger that, when the molding is interrupted, hardening takes place in the molding machines making the continuation of molding impossible.

As described above, in either the case of conventional binders for extrusion or injection molding, there are problems such as the rate of powder packing is low and a long period of time is necessary to remove binders. In addition, molded articles which are weak are produced depending upon the kind of binder; and they are contaminated with impurities or become heterogeneous by increase in the required discharge capacity of molding machines and abrasion of the machines. Consequently, the establishment of binder techniques solving these problems is strongly demanded by the industrial world.

SUMMARY OF THE INVENTION

As a result of an extensive study in view of the foregoing problems, the present inventors succeeded in obtaining molded articles free from these defects by using a plural number of waxes containing oxygen-containing wax components (hereinafter referred to as "oxygen-containing wax type binder"). The inventors also found binders usable for extrusion or injection molding of inorganic powders which are capable of giving such characteristics to the molded articles. The present invention was completed based on these findings.

DETAILED DESCRIPTION OF THE INVENTION

The oxygen-containing wax type binder of the present invention, because of its low viscosity on melting and good compatibility with inorganic powders, easily penetrates into the gaps of aggregates of fine inorganic powders, and has a superior lubricating property. For this reason, this binder makes it possible to obtain molded articles having a homogeneous powder dispersion as well as a very high powder packing density which could never be attained with conventional binders. Further, molded articles produced can harden themselves easily and immediately after molding by cooling. Particularly, in extrusion molding in which the dimensional precision of molded articles is difficult to maintain, the binder of the present invention can markedly improve the dimensional precision as compared with the conventional ones. Of the conventional binders, thermoplastic synthetic resin binders are also capable of hardening molded articles by cooling. However, these binders have a high melt viscosity and a poor flowability as compared with the binder of the present invention. In order to make up for these defects, an increased amount of a binder which is poorer in thermal conductivity than the inorganic powder must be used. This is not desirable because much time is taken for cooling the molded article and it easily changes in shape during cooling. Further, when conventional water-soluble binders are used, the molded article is weak and not easy to handle until the water as solvent is vaporized away. Further, molded articles such as thin products and large-sized ones sometimes change in shape by their own weight whereby maintenance of dimensional precision is even more difficult.

The oxygen-containing wax type binder of the present invention not only solves the problems of the conventional binders in extrusion or injection molding of inorganic powders, but also has a markedly superior property over conventional binders with respect to the removal of binder as described below.

The oxygen-containing wax type binder of the present invention is composed of a number of waxes containing oxygen-containing wax components. Therefore, the binder has no definite thermal decomposition point, its temperature range of thermal decomposition having a considerably large width. For this reason, when molded articles obtained with the binder of the present invention are heated, the thermal decomposition of the oxygen-containing wax type binder will not occur suddenly at a certain temperature, showing a slow progress with a rise in temperature which is a characteristic not observed with conventional binders. When conventional synthetic resin binders are used, the generation of foams or cracks on molded articles by gases evolved from suddenly decomposing binders can not be avoided unless the rate of temperature-rise in the vicinity of the thermal decomposition temperature is several degrees per hour or, in some cases much slower than this. Contrary to this, with the oxygen-containing wax type binder of the present invention, it has become possible to remove the binder without doing any damage to the molded articles even by heating at a rate of temperature-rise of several tens to 100 degrees per hour.

Thus, the present inventors succeeded in shortening a thermal decomposition step for a binder. In the method for producing the sintered body of inorganic powders by extrusion or injection molding using the conventional binders, the longest period of time is required for the removal of the binder. Consequently, the role of the oxygen-containing wax type binder of the present invention fulfilled in productivity improvement in the production of sintered body, is immeasurable.

The generation of foams and cracks on molded articles was also observed with the conventional water-soluble binders on removing water as a solvent from the molded articles unless the water was vaporized as slowly as in the synthetic resin binders. Consequently, the binder-removing step in a broad sense was very poor in productivity. Also, with wax type binders, their thermal decomposition in the course of heating/temperature-rise is sudden when they consist mainly of a single compound unlike the binders of the present invention. Therefore, the effect observed with the oxygen-containing wax type binder of the present invention is not obtained.

As described above, by using the oxygen-containing wax type binder of the present invention, it became possible to produce the homogeneous, high-packing density molded article of inorganic powders which could not be obtained by extrusion or injection molding using the conventional binders, and therefore, a great reduction in the sintering temperature also became possible.

These effects brought by the oxygen-containing wax type binder of the present invention are particularly displayed in the production of translucent ceramics represented by a translucent alumina sintered body requiring high-temperature sintering. Accordingly, the commercial value of the present invention which enabled high-quality articles to be supplied at low costs, is immeasurable.

Examples of the oxygen-containing wax type binder used in the present invention which are solid or semi-solid at room temperature include (1) higher fatty acids and esters and glycerides of the higher fatty acid with a higher alcohol; and (2) oxygen-containing compounds obtained by air-oxidation of normal paraffin or isoparaffin such as alcohols, ketones, carboxylic acids, oxycarboxylic acids, ketocarboxylic acids, esters, lactones and the like.

These oxygen-containing wax type binders may be natural waxes and/or synthetic waxes. The natural waxes include for example animal waxes such as bees wax, whale wax, China wax, wool wax, etc., vegetable waxes such as candelilla wax, carnauba wax, Japan wax, Ouricury wax, sugar cane wax, etc., and mineral waxes such as montan wax, ozokerite wax, ceresine, lignite wax, etc. The synthetic waxes include for example modified waxes such as montan wax derivatives, paraffin wax derivatives, microcrystalline wax derivatives, etc., higher monohydric alcohols such as cetyl alcohol, ceryl alcohol, melissyl alcohol, stearyl alcohol, myristyl alcohol, lauryl alcohol, etc., higher fatty acids such as capric acid, lauric acid, myristic acid, palmitic acid, stearic acid, etc., fatty acid esters such as cetyl palmitate, melissyl palmitate, ceryl cerotate, etc., and glycerides such as tripalmitin, tristearin, etc.

Hydrocarbon waxes which can be blended with these natural or synthetic oxygen-containing waxes include petroleum waxes such as paraffin wax, microcrystalline wax, petrolatum, etc., synthetic hydrocarbons such as Fischer-Tropsch wax, low molecular weight polyethylene, etc.

Of these waxes, oxygen-containing waxes such as vegetable waxes, modified waxes, higher fatty acids, etc., and mixtures of these oxygen-containing waxes with petroleum waxes or synthetic hydrocarbon waxes are preferably used, as such or in compositions comprising mixtures thereof, from the standpoint of moldability. Particularly, in terms of moldability and thermal decomposability, the effect of the present invention can be displayed most effectively when carnauba wax, paraffin wax derivatives (e.g. oxidized paraffin wax), microcrystalline wax derivatives (e.g. oxidized microcrystalline wax), higher fatty acids (e.g. stearic acid, isostearic acid, lauric acid) and mixtures of these oxygen-containing waxes with paraffin wax, microcrystalline wax, or low molecular weight polyethylene are used alone or in combination. Further, of these combinations, compositions obtained by mixing paraffin wax, oxidized paraffin wax, microcrystalline wax or oxidized microcrystalline wax and higher fatty acids (e.g. stearic acid) display the greatest effect. Of these oxygen-containing waxes, oxidized waxes having an acid value of 1 to 80 mg-KOH/g prepared by oxidizing a linear hydrocarbon having an average of 17 to 40 carbon atoms or a branched hydrocarbon having an average of 30 to 150 carbon atoms particularly exhibit the effects of the present invention with respect to moldability and thermal decomposability.

The content of the oxygen-containing waxes in the oxygen-containing wax type binder of the present invention is preferably not less than 1% by weight in terms of thermal decomposability, and particularly good results are obtained when the content is not less than 5% by weight. The content of the oxygen-containing waxes in the binder composition is most preferably not less than 10% by weight, in which case the greatest effect is displayed.

The amount of the oxygen-containing wax type binder of the present invention used varies with the physical property of an inorganic powder to be molded. However, it is preferably in a range of 15 to 60% by volume based on the molded article comprising the binder and the inorganic powder. When the amount is below this range, flowability on molding is so insufficient that molding becomes difficult. When the amount exceeds this range, the ease of thermal decomposition of binder which is characteristic of the present invention is decreased. When the proportion of the binder occupying the molded article is 25 to 55% by volume, the wax type binder of the present invention will best display its effect.

Examples of the inorganic powder to which the binder of the present invention is applicable include powders of single metallic or non-metallic elements and oxides or non-oxides thereof which are usable for powder metallurgy or production of ceramics. Also, the composition of these powders may be composed of any of single elements, alloys or compounds alone or in combination. The number of the constituent metallic elements of the oxides and non-oxides as well as cations and anions is one or more. Further, systems containing the oxides or non-oxides and additives added to improve the characteristics thereof may also be applied to the present invention.

Examples of specific metallic powders include aluminum of Group III of the periodic table (long form; the same applies hereinafter); silicon of Group IV; scandium, yttrium, lanthanoids and actinoides of Group IIIa; titanium, zirconium, hafnium and thorium of Group IVa; vanadium, niobium, tantalum and protactinium of Group Va; chromium, molybdenum, tungsten and uranium of Group VIa; manganese, technetium and rhenium of Group VIIa; iron, cobalt, nickel, ruthenium, rhodium, palladium, osmium, iridium and platinum of Group VIII; copper, silver and gold of Group Ib; zinc and cadmium of Group IIb; thallium of Group IIIb; germanium, tin and lead of Group IVb; arsenic, antimony and bismuth of Group Vb; and tellurium and polonium of Group VIb.

Specific examples of the oxide powders include oxides of the above referred to metals. Oxides of other metals than the above-mentioned ones include beryllium oxide, magnesium oxide, calcium oxide, strontium oxide, barium oxide, lanthanum oxide, gallium oxide, indium oxide, selenium oxide and the like. Specific examples of oxides containing a plural number of metal elements, generally called double oxides, include the following which are classified with respect to crystal structure: Perovskite-type oxides such as $NaNbO_3$, $SrZrO_3$, $PbZrO_3$, $SrTiO_3$, $BaZrO_3$, $PbTiO_3$, $AgTaO_3$, $BaTiO_3$, $LaAlO_3$, etc.; spinel-type oxides such as $MgAl_2O_4$, $ZnAl_2O_4$, $CoAl_2O_4$, $NiAl_2O_4$, $NiCr_2O_4$, $FeCr_2O_4$, $MgFe_2O_4$, $Fe_3O_4$, $ZnFe_2O_4$, etc.; illmenite-type oxides such as $MgTiO_3$, $MnTiO_3$, $FeTiO_3$, $CoTiO_3$, $NiTiO_3$, $ZnTiO_3$, $LiNbO_3$, $LiTaO_3$, etc.; and garnet-type oxides such as rare earth-gallium garnet represented by $Gd_3Ga_5O_{12}$ and rare earth-iron garnet represented by $Y_3Fe_5O_{12}$.

Examples of non-oxide powders of metal include carbides, nitrides, borides, sulfides and the like of the metals described above. Of these metal non-oxides, the binders of the present invention are particularly effective with respect to carbides such as SiC, TiC, WC, TaC, HfC, ZrC and $B_4C$; nitrides such as $Si_3N_4$, AlN, BN and TiN; and borides such as $TiB_2$, $ZrB_2$ and $LaB_6$.

The binder of the present invention is useful independently of the particle size and shape of the powder. It is however effective when used with powders of not more than 100 $\mu$m in average particle size. Also, as the powder becomes fine, the homogeneity of molded articles becomes important, so that the binder of the present invention is particularly effective when used with powders of not more than 20 μm in average particle size. Further, the binder of the present invention exhibits its effect most when applied to fine powders of not more than 5 μm in average particle size. The binder of the present invention is also effective when used with super-fine powders of less than 0.01 μm in average particle size. However, it displays its effects better when applied to fine powders of not less than 0.01 μm in average particle size.

Of these inorganic powders, the binder of the present invention is preferably applied to oxide powders, particularly the metal oxide powders for the production of translucent material, insulating materials, semi-conductor materials, piezoelectric materials, magnetic materials, electro.optical materials and the like. Further, the binder of the present invention is particularly effective in producing translucent materials such as $Al_2O_3$, MgO, $Y_2O_3$ and $MgAl_2O_4$ formed into pipes as illumination tubes for discharge lamp, and $Pb_{1-x}La_xZr_{1-y}Ti_yO_3$ (wherein x is 0 to 1.0 and y is 0 to 1.0) formed into various shapes.

Examples of devices for molding inorganic powders using the oxygen-containing way type binder of the present invention include extrusion and injection molding machines for plastics or ceramics which can be heated to a temperature more than that at which the binder composition melts. Also, so far as the effect of the oxygen-containing wax type binder of the present invention is not damaged, it may optionally be selected whether the inorganic powder and the binder composition of the present invention are previously kneaded or granulated and then molded on the above molding machines, or after blending, directly added to the machines and molded. The molded body is heated to carry out defattying and calcination. The calcinated body is sintered by usual methods.

Next, the present invention will be illustrated in detail with reference to the following examples and comparative examples, which are not however to be interpreted as limiting the invention thereto. Unless otherwise stated, all the percents in the examples are by weight. Of the physical properties of sintered bodies, the density is a value, expressed in percent, of the ratio of the density of sintered body to the theoretical density of aluminum oxide. The light transmittance is a value, expressed in percent, of the ratio of the intensity of incident light when parallel luminous flux is omitted at a right angle to the longitudinal direction of a pipe-like sintered body of 0.8 mm in thickness (vertical to the inner wall surface of the pipe) at the inner surface thereof to the intensity of the transmitted luminous flux on the extension of the incident luminous flux of the luminous fluxes passing through the sample.

EXAMPLE 1

One hundred grams of oxidized microcrystalline wax (m.p. 78° C.; acid value: 12 mg-KOH/g) as oxygen-containing wax, 20 g of stearic acid and 1 kg of aluminum oxide powder (purity, 99.9%; average particle size, 0.5 μm) to which 0.1% of magnesium oxide had been added, were kneaded at 160° C. for 10 minutes on a kneader. The binder in this example has 16.6 wt% of stearic acid and 83.4 wt% of oxidized microcrystalline wax. This mixed composition was extrusion-molded at 90° C. to 180° C. into a pipe of 10 mm in inside diameter and 1 mm in thickness, and then heated at a temperature gradient of 50° C./hr and maintained at 800° C. for 1 hour to carry out defatting and calcination. Thereafter, the pipe was sintered at 1700° C. for 3 hours in vacuum to obtain a translucent alumina sintered pipe. The result of the pipe thus obtained is shown in Table 1. As is apparent from Table 1 including the result of later-mentioned Comparative Examples together, only the oxygen-containing wax type binder of the present invention shows that flowability is observed on molding, the molded article has a high powder packing density, time required for defatting is short, and the sintered body has high translucency.

Comparative Example 1

A procedure was carried out in completely the same manner as in Example 1 except that paraffin wax (m.p. 70° C.) and microcrystalline wax (m.p. 78° C.) each comprising hydrocarbons was used in place of the oxygen-containing wax, and moldability defatting property and the performances of sintered body were evaluated. The molded articles obtained with paraffin wax and microcrystalline wax, because of their sudden thermal decomposition on defatting, showed the generation of foams and cracks. For this reason, in producing the sintered body, defatting was carried out by heating to 400° C. at a temperature gradient of 1° C./hr over a 50 times longer period of time than in Example 1. The result of evaluation is shown in Table 1.

Comparative Example 2

Using 20 g of stearic acid and 100 g of polystyrene in place of the wax type binder in Example 1, extrusion molding was carried out at 180° C. in the same manner as in Example 1. But, the flowability was poor so that a molded article was not obtained. Then, the amount of polystyrene was increased to 170 g, and extrusion molding and defatting were carried out in the same manner as in Example 1. Under the same defatting condition as in Example 1, however, the decomposition of polystyrene was so sudden that the molded article foamed. The sintered body was prepared by defatting at a rate of heating of 1° C./hr in the same manner as in Comparative Example 1.

Comparative Example 3

Example 1 was followed in completely the same manner except that extrusion molding was carried out at room temperature using 200 g of water and 50 g of polyvinyl alcohol in place of the oxygen-containing wax type binder, and moldability defatting property and the performances of sintered body were compared. But the molded article obtained changed in shape immediately after extrusion due to its own weight, and thus the section of pipe did not form a perfect circle. Also, under the same heating condition as in Example 1, water evaporation in the vicinity of 100° C. was so sudden that cracks were formed in the molded article. For this reason, the molded article was heated as follows so as to prevent cracks from forming in the molded article: Heating to 100° C. at a temperature gradient of 2° C./hr under saturated steam pressure; heating at 100° C. for 5 hours; heating to 800° C. at a temperature gradient of 20° C./hr; and then heating at 800° C. for 1 hour. Thereafter, sintering was carried out in the same manner as in Example 1, but a sintered body having translucency was not obtained.

EXAMPLE 2

A mixture of the oxygen-containing wax type binder of Example 1 and an aluminum oxide powder was injection-molded into a molded article of 20 mm (wide)×50 mm (long)×2 mm (thick) on a screw-type injection molding machine under the following conditions: Cylinder temperature, 120°–180° C.; mold temperature, room temperature; pressure, 700 kg/cm$^2$; residence time in mold, 2 seconds. The molded article was homogeneous without cavities. This molded article was defatted and sintered in the same manner as in Example 1 The sintered body obtained showed good translucency.

EXAMPLE 3

140 g of carnauba wax (m.p. 83° C.; acid value; 8 mg-KOH/g) as oxygen-containing wax type binder, 10 g of stearic acid and 1 kg of magnesium oxide (average particle size, 1 μm) containing 0.2% of magnesium fluoride were extrusion-molded and defatted in the same manner as in Example 1. Thereafter, sintering was carried out at 1400° C. for 2 hours in vacuum. The molded article of this example was very homogeneous and also good in strength. The sintered body obtained had translucency.

While the invention has been described in detail and with reference to specific embodiment thereof, it will be apparent to one skilled in the art that various changes and modifications can be made therein without departing from the spirit and scope thereof.

What is claimed is:

1. A method for producing a translucent alumina sintered body used in illumination tubes for discharge lamps comprising subjecting a mixture of (1) an aluminum oxide powder having an average particle size of not more than 20 μm and a purity of 99.9% or more and (2) a composition as a binder consisting essentially of (a) about 16.6 to 90% a higher fatty acid with (b) about 10 to 83.4%, based on the total weight of the composition, of an oxidized wax having an acid value of 1 to 80 mg-KOH/g prepared by oxidizing a linear hydrocarbon having an average of 17 to 40 carbon atoms or a branched hydrocarbon having an average of 30 to 150 carbon atoms to extrusion molding to obtain a molded body, said molded body comprising 15 to 60% by volume of said binder, and then sintering the molded body.

2. A method as claimed in claim 1, wherein said aluminum oxide powder has an average particle size of from 0.01 μm to 5 μm.

* * * * *

TABLE 1

Relation of Binder Composition with Moldability, Defatting Property and Physical Property of Sintered Body

| | | | Moldability | | | Defatting Property | | Physical Property of Sintered Body | |
|---|---|---|---|---|---|---|---|---|---|
| | Classification of Binder | Composition of Binder | Flow-ability on Molding | Dimensional Stability of Molded Article | Packing Density of Powder (%) | Stability by Heating Defatting at 50° C./hr | Period of Time required for defatting to 400° C. (hr) | Density (%) | Light Transmittance (%) |
| Example 1 | Oxygen-containing Waxes | Oxidized Microcrystalline Wax and Stearic Acid | ⊚ | ⊚ | 65 | Good | 8 | 99.9 | 35 |
| Comparative Example 1 | Waxes containing no Oxygen-containing Waxes | Paraffin Wax | ○ | ⊚ | 63 | Foaming cracking | 400 | 99.8 | 30 |
| | | Microcrystalline Wax | ○ | ⊚ | 63 | Foaming cracking | 400 | 99.8 | 30 |
| Comparative Example 2 | Thermoplastic Synthetic Resins | Polystyrene and Stearic Acid | x | ○ | 53 | Foaming | 400 | 99.4 | 13 |
| Comparative Example 3 | Water-soluble Polymers | Polyvinyl alcohol and Water | x | x | 48 | Cracking | 90 | 99.3 | 10 |

⊚: excellent
○: good
x: bad